United States Patent
Righi et al.

(10) Patent No.: US 7,293,169 B1
(45) Date of Patent: Nov. 6, 2007

(54) METHODS AND SYSTEMS FOR REMOTELY UPDATING THE FIRMWARE OF MULTIPLE COMPUTERS OVER A DISTRIBUTED NETWORK

(75) Inventors: Stefano Righi, Lawrenceville, GA (US); Brian Richardson, Loganville, GA (US); Jerry Petree, Alpharetta, GA (US)

(73) Assignee: American Megatrends, Inc., Norcross, GA (US)

( * ) Notice: Subject to any disclaimer, the term of this patent is extended or adjusted under 35 U.S.C. 154(b) by 406 days.

(21) Appl. No.: 10/771,016

(22) Filed: Feb. 3, 2004

Related U.S. Application Data (60) Provisional application No. 60/450,039, filed on Feb. 26, 2003.

(51) Int. Cl.
*G06F 15/177* (2006.01)
(52) U.S. Cl. ............... 713/2; 709/220; 717/171
(58) Field of Classification Search ............... 713/2; 709/220; 717/171
See application file for complete search history.

(56) References Cited

U.S. PATENT DOCUMENTS

| | | | |
|---|---|---|---|
| 6,175,919 B1 * | 1/2001 | Ha ........................ 713/100 |
| 6,438,688 B1 * | 8/2002 | Nunn ........................ 713/2 |
| 6,640,334 B1 * | 10/2003 | Rasmussen ............... 717/171 |
| 6,732,267 B1 * | 5/2004 | Wu et al. ................. 713/100 |
| 6,970,917 B1 * | 11/2005 | Kushwaha et al. ........ 709/217 |
| 2004/0015952 A1 * | 1/2004 | Lajoie et al. ............ 717/171 |

\* cited by examiner

*Primary Examiner*—Thuan Du
(74) *Attorney, Agent, or Firm*—Hope Baldauff Hartman, LLC (57) ABSTRACT

These systems and methods make use of operating system dependent applications that allow remote updates to firmware stored on network attached remote computers. Updates to the remote computers may occur on any computer in the network despite diverse hardware architectures and various operating systems executing between the computers. A command to update the firmware on the remote computers is initiated from a manager utility application operating on a network attached manager computer. The command is then received at an agent application operating on each remote computer. Each agent application monitors command activity via a communication port. Upon determining that the command is valid, each agent application receives an update application and a new firmware file from a network attached computer or data storage and utilizes the update application and the new firmware file to update the firmware of each network attached computer.

22 Claims, 4 Drawing Sheets

METHODS AND SYSTEMS FOR REMOTELY UPDATING THE FIRMWARE OF MULTIPLE COMPUTERS OVER A DISTRIBUTED NETWORK

CROSS REFERENCE TO RELATED APPLICATIONS

The present application claims priority under 35 U.S.C. 119 to co-pending U.S. provisional application No. 60/450,039 entitled "Methods and Systems dating a Computer Basic Input/Output System Over a Distributed Computing Network," filed on Feb. 26, 2003, and which is expressly incorporated herein by reference.

TECHNICAL FIELD

The present invention is related to remote management features of computer systems. More particularly, the present invention is related to methods and systems for remotely updating the firmware of multiple computers over a distributed network.

BACKGROUND OF THE INVENTION

Reducing the time and labor of update operations on multiple server and/or client computers is an ongoing objective of network administrators and computer system manufacturers. In many modern computer systems, the firmware, such as the basic input/output system ("BIOS"), is stored as groups of memory blocks in one or more re-programmable memory devices. These re-programmable memory devices, typically known as "flash" parts, are a type of non-volatile random access memory ("NVRAM") that allows the firmware BIOS to be updated by using software to erase and program each flash part.

Previous methods for updating firmware stored on the flash memory of a computer system require a video display and input device connected to the computer to be updated and direct contact with the computer to be updated through the display and input device. In one method, the firmware in previous systems is updated by utilizing an application program that utilizes files containing the updated firmware stored on a local device or available through a serial port connection. In the alternative, an update may occur in previous systems through a program provided within the BIOS. While both of these methods for updating the firmware of a computer system work well when a display and keyboard are available and when physical access to the computer may be had, headless computers and server computers within server farms are usually without a console and are remotely operated.

Removing the need to physically operate each computer to update the firmware is especially critical for server farms having numerous computers without a display or keyboard that need updating. Manually updating each computer in a server farm can take an excessive amount of time and administrator labor. Furthermore, updates that occur while operating systems are executing on the network attached computers become even more complex when various operating systems are executing on the various computers, potentially requiring a different update procedure for each computer depending on the operating system manufacturer or version.

It is with respect to these considerations and others that the present invention has been made.

SUMMARY OF THE INVENTION

In accordance with the present invention the above and other problems are solved by methods and systems for remotely updating the firmware of multiple computers over a distributed network. These systems and methods make use of operating system ("OS") dependent applications that allow remote updates to firmware or program code stored on network attached or remote computers. The computers may be server computers in a server farm, client computers, and/or headless computers without a console. Updates to the computers may occur on any computer on the network despite diverse hardware architectures and various operating systems executing upon the computers to be updated.

In accordance with other aspects, the present invention relates to a method for updating firmware on remote computers via a network such as a Local Area Network ("LAN"), a Wide Area Network ("WAN"), or a large scale distributed computing network such as the Internet. A command to update the firmware on the network attached computers is initiated from a manager utility application executing on a network attached manager computer serving as a management station. The command is then received at an agent application executing on each network attached computer. The manager utility application initiates the command to update the firmware utilizing a network address for each network attached computer to be updated and the identity of the communication port upon which the agent application monitors command activity.

Each agent application monitors command activity upon a specified communication port and utilizes additional processor resources on the network attached computer upon receiving a command. For instance, upon receiving the update command, the agent application executes an update application. The update application receives a new firmware file from any network attached computer or network data storage device designated by the command. The command defines where the update application and the new firmware file are stored thereby instructing each agent application where to locate the update application and the new firmware file. Upon execution, the update application utilizes the new firmware file to update the firmware on the network attached computer upon which it is executing.

Although the management application and the agent application are executing an update to the firmware while an OS is executing on each network attached computer, the operating systems executing on the networked computers may be different. For instance, the WINDOWS operating system from MICROSOFT CORPORATION of Redmond, Wash., the LINUX operating system, or the MACINTOSH operating system from APPLE COMPUTER may be used variously on the networked computers to be updated.

After the update is executed, a result of the update is transmitted from each network attached computer to the manager utility application executing on the manager computer. If the update was successfully completed, the network attached computer is restarted, or rebooted utilizing the new firmware. The manager utility application may transmit commands serially to each network attached computer to update the firmware on each network attached computer.

In accordance with other aspects, the present invention relates to a system for remotely updating, via a network, firmware residing on one or more network attached remote computers accessible via a network to a network attached manager computer initiating the update. The manager computer is connected to the network and includes computer-executable instructions contained in memory that are operative, when executed, to transmit a command to update the firmware on each network attached remote computer. An agent application monitoring command activity on each remote computer, receives, via the network, the command from the manager computer to update the firmware on each networked remote computer.

Upon receiving the command and determining that the command is valid, the agent application executes an update application from a storage device on the network. The update application utilizes the new firmware file to update the firmware of the network attached remote computer upon which it is executing. After installing the update, the remote computer executing the update transmits a result of the firmware update to the manager computer.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

As described briefly above, embodiments of the present invention provide methods and systems for remotely updating the firmware on multiple computer systems over a distributed network. In the following detailed description, references are made to accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
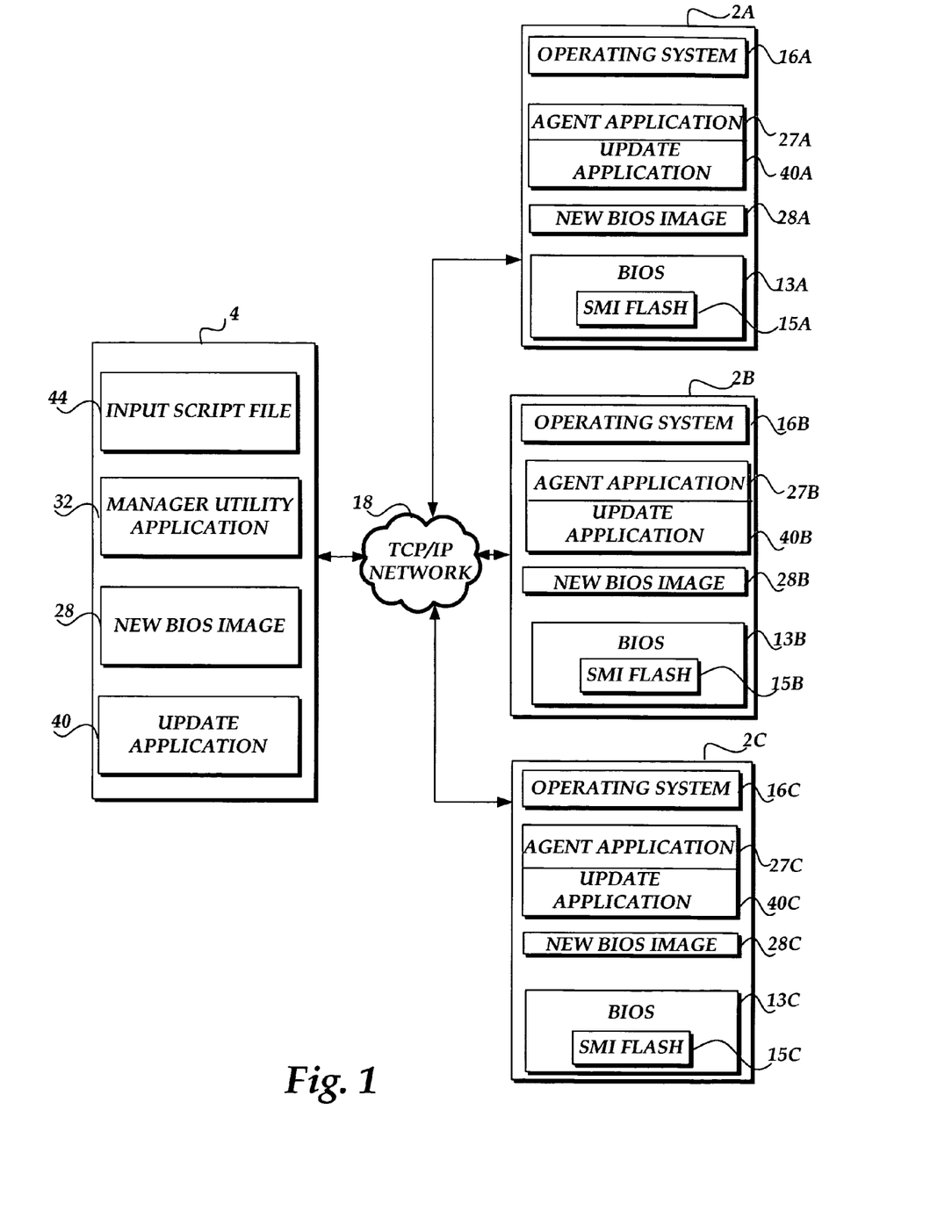
FIG. 1 is a schematic diagram illustrating a aspects of a client/server network utilized in an embodiment of the invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the embodiments of the invention may be implemented. While the invention will be described in the general context of program modules that execute to update a firmware BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a system for remotely updating the firmware of multiple computers via a network will be described. As shown in FIG. 1, the system includes a manager computer 4. The manager computer 4 comprises a standard personal or server computer operative to execute a manager utility application 32, which operates in conjunction with an input script file 44 to transmit update commands to one or more remote or network attached computers, represented by the network attached computers 2A-2C, over the network 18. As will be described in greater detail below with respect to FIG. 3, the input script file 44 contains data that assists the manager utility application 32 in locating the remote computers 2A-2C and the communication ports of the remote computers designated for listening to or monitoring command activity.

The manager computer 4 is connected to a network 18, such as a LAN, WAN, or other type of distributed computing network, such as the Internet, that supports the transmission control protocol/Internet protocol ("TCP/IP"). It should be appreciated, however, that the manager computer may be configured for communication over other types of networks including wireless networks. Alternatively, the manager computer 4 may comprise another type of computing device operative to access the network 18, such as a personal digital assistant or other type of computer.

The manager computer 4 also includes a new BIOS image file 28 for use in conjunction with the update application 40. In particular, the update application 40 and BIOS image file 28 are received into the memory of the network attached computers 2A-2C that receive a valid update command. The update application 40 then executes an update to the firmware on the network attached computers by replacing the current firmware image with the new BIOS image file 28. As will be described in greater detail below the update application 40 and the BIOS image file 28 may be located on any storage device on the network as illustrated with BIOS image files 28A-28C and update applications 40A-40C. The update command transmitted to the remote computers 2A-2C identifies the location of the update application 40 and the BIOS image file 28 to be used in updating the firmware on the remote computers 2A-2C.

The remote computers 2A-2C may comprise a network of standard desktop computers, a network of headless computers and/or a farm of server computers. The remote computers 2A-2C are connected to the network 18 and are operative to execute the agent applications 27A-27C. The agent applications 27A-27C operate in conjunction with the operating systems 16A-16C to monitor or "listen" on an assigned communication port, for commands transmitted to the remote computers 2A-2C. Once an agent application 27A, 27B, and/or 27C receives a command from the manager utility application 32, the agent application executes the update application 40 with the information of which BIOS image file 28 to utilize in updating the firmware. The update application 40 is operative to receive the BIOS image file 28 from a storage location designated by the update command. For instance, the BIOS image file may be received from the manager computer 4. It should be appreciated that the update application 40 and the new BIOS image 28 may be received from any storage location on the network 18. It should also be appreciated that the network 18 may support wireless network activity.

Once the BIOS image file 28 and the update application 40 have been received into the memory of a remote computer 2A, 2B, or 2C, the update process is continued. For instance, when the BIOS image file 28 and the update application 40 have been received into the memory of the remote computer 2A, the flash utility 15A may use a system management interrupt ("SMI") to allow the BIOS 13A to receive an update independent of the status of the processor and the operating system context. The flash utility 15A is used by the update application 40A to erase and replace the current BIOS 13A image file with the BIOS image file 28A. Additional details regarding remote firmware updates will be described below with respect to FIGS. 2-4.

Figure 2:
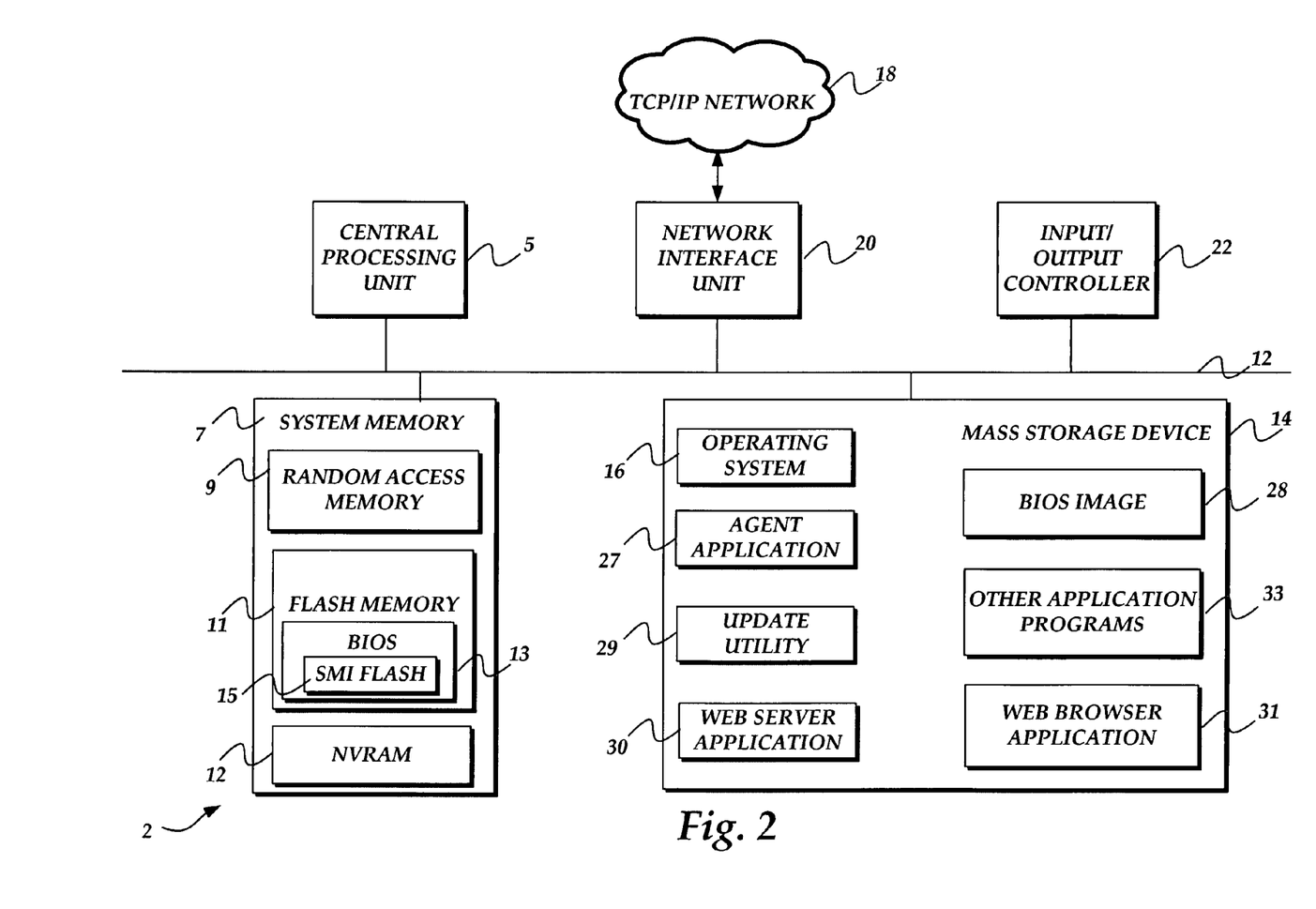
FIG. 2 illustrates a computer system architecture for a network attached remote computer utilized in embodiments of the invention.

Referring now to FIG. 2, an illustrative computer architecture for a computing system 2 for practicing the various embodiments of the invention will be described. The computer architecture shown in FIG. 2 illustrates a conventional server, or personal computer 2, including a central processing unit 5 ("CPU"), a system memory 7, including a random access memory 9 ("RAM") and a flash memory 11, and a system bus 12 that couples the system memory 7 to the CPU 5.

A basic input/output system ("BIOS") 13 containing the basic routines that help to transfer information between elements within the computer, such as during startup, is stored in the flash memory 11. The BIOS 13 is the firmware program the CPU 5 uses to get the computer system started after it is powered on. During boot, the BIOS 13 also manages data flow between the computer's OS 16 and attached devices such as a hard disk, video adapter, keyboard, mouse and printer. At run time, the BIOS 13 is able to handle platform power states or SMI. The SMI flash 15 is also stored in the BIOS 13 to interrupt the OS operations in runtime to allow the BIOS 13 to execute independently from the status of the CPU 5 in the OS 16 context. The SMI flash 15 enables the BIOS 13 updates during OS 16 execution.

The BIOS 13 is an integral part of the computer and comes with it from the manufacturer. In contrast, the OS can either be preinstalled by the manufacturer or vendor or installed by the user. The BIOS 13 is made accessible to the microprocessors on an erasable programmable read-only memory "EPROM" chip. When the computer 2 is powered on, the CPU 5 passes control to the BIOS program, which is always located at the same place on the flash memory 11.

When the BIOS 13 boots up the computer, it first determines whether all of the attachments are in place and operational and then it loads the OS, or key parts of it, into a computer's RAM from a hard disk or diskette drive. Sometimes changes can be made to the system configuration during BIOS setup. As described herein, in order to store the maximum amount of data on the flash memory 11, portions of the BIOS may be stored in a compressed format. The compressed portions are decompressed prior to execution by the CPU 5.

The computing system 2 also includes a NVRAM 12 for storing configuration data for the BIOS and other information. The NVRAM 12 is a type of memory that retains its contents when power is turned off. One type of NVRAM is SRAM that is made non-volatile by connecting it to a constant power source such as a battery. Another type of NVRAM uses EEPROM chips to save its contents when power is turned off. In this case, NVRAM is composed of a combination of SRAM and EEPROM chips.

The remote computer system 2 further includes a mass storage device 14 for storing an OS 16 and OS 16 dependent application programs such as the agent application 27 for monitoring and responding to update commands from the manager computer 4. Once received from a data storage device on the network 18, the update application 40 and the BIOS image 28 for executing an update to the BIOS 13 may also be stored on the storage device 14. As described below with respect FIG. 4, upon receiving the update application 40 and the new BIOS image file 28 into the memory of the computer 2, the BIOS 13 is updated with the new BIOS image 28.

The remote computer 2 may also be operative to execute a Web server application 30, a Web browser application 31, such as the INTERNET EXPLORER browser from MICROSOFT CORPORATION of Redmond, Wash., and other OS 16 dependent application programs 33 such as a word processing program. The mass storage device 14 is connected to the CPU 5 through a mass storage controller (not shown) connected to the bus 12. The mass storage device 14 and its associated computer-readable media, provide non-volatile storage for the computer 2. Although the description of computer-readable media contained herein refers to a data storage device such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as a LAN, WAN, or a large scale distributed computing network such as the Internet. The computer 2 may connect to the network 18 through a network interface unit 20 connected to the bus 12. It should be appreciated that the network interface unit 20 may also be utilized to connect to other types of networks and remote computer systems, including wireless networks. The computer 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device. It should be appreciated that the computer 2 may be a headless computer not utilizing or possessing display output or keyboard input capabilities. The computer 2 may also be without local floppy storage or serial port access.

As mentioned briefly above, a number of program modules and data files may be stored in the mass storage device 14 and RAM 9 of the computer 2, including an operating system 16 suitable for controlling the operation of a networked personal or server computer, such as the WINDOWS XP operating system from MICROSOFT CORPORATION of Redmond, Wash. or the LINUX operating system.

Figure 3:
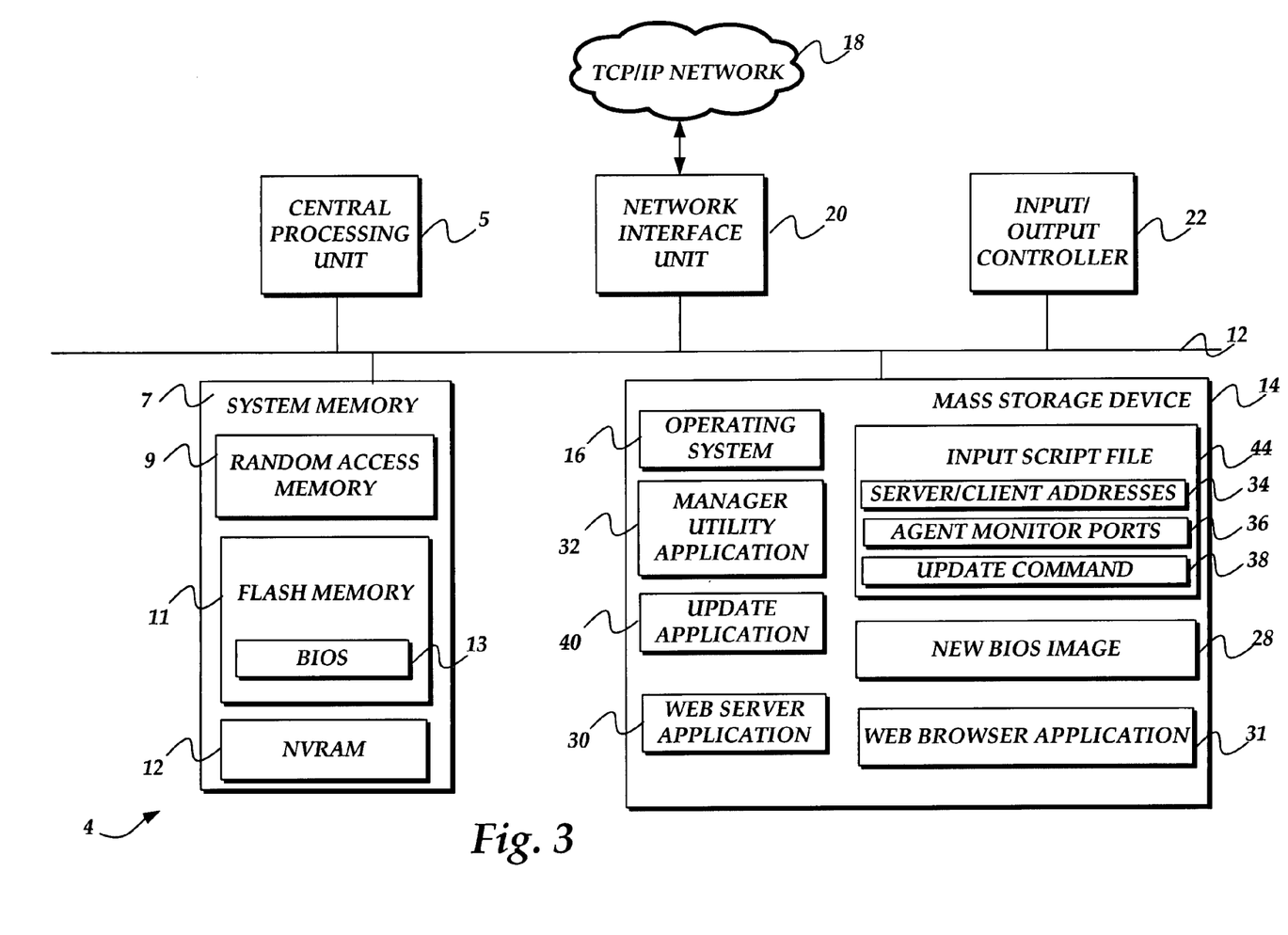
FIG. 3 illustrates a computer system architecture for a network attached manager computer utilized in embodiments of the invention.

Turning now to FIG. 3, an illustrative computer architecture for a manager computer 4 for practicing the various embodiments of the invention will be described. The computer architecture shown in FIG. 3 illustrates a conventional server or personal computer, including a CPU 5 and a system memory 7 containing the components described above with respect to FIG. 2. The manager computer system 4 also includes a mass storage device 14 for storing an OS 16 and application programs, such as the manager utility application 32 for initiating and transmitting update commands or requests from the manager computer 4 to the network attached computers 2A-2C. The mass storage device 14 may also store the update application 40 and the BIOS image 28 both of which may be received, via the network 18, by the agent application 27, described above with respect to FIG. 2.

The manager utility application 32 utilizes the input script file 44 to execute transmission of an update command. The input script file 44 stores the network addresses 34 of all the computers 2 that are to be updated, the communication ports 36 monitored by the agent applications 27 described above in FIGS. 1-2, and the update command for transmission that also defines from what storage device the update application 40 and the new BIOS image 28 are to be received. The manager computer 4 may also be operative to execute a Web server application 30 and a Web browser application 31 as described above in FIG. 2.

Figure 4:
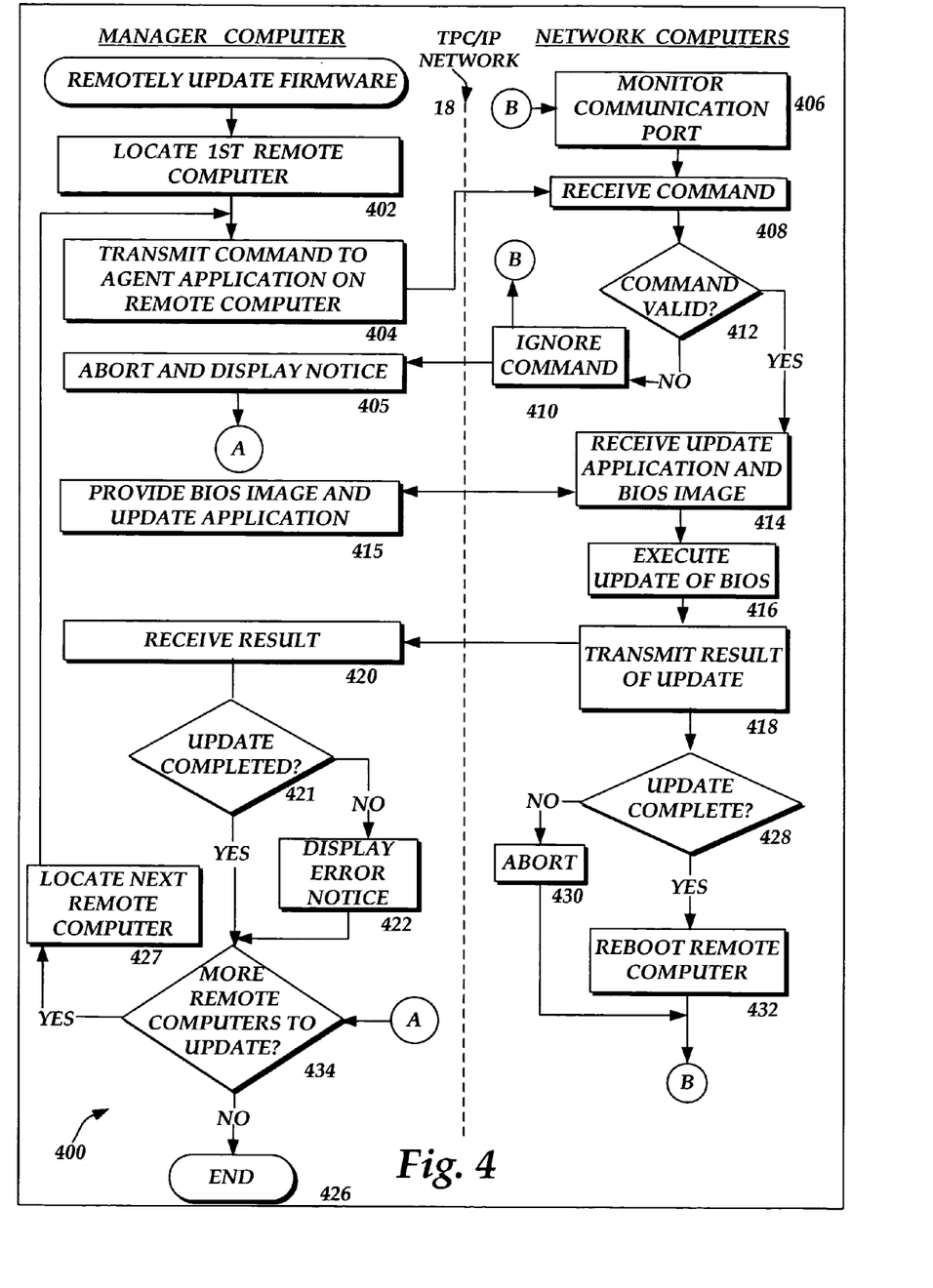
FIG. 4 illustrates an operational flow performed in remotely updating firmware according to an embodiment of the invention.

Turning now to FIGS. 1 and 4, an illustrative routine 400 will be described for remotely updating the firmware of the network attached or remote computers 2A-2C. It should be appreciated that the number of remote computers 2 on the network 18 may vary from one up to and beyond one hundred. The routine 400 begins at operation 402 where the manager computer 4 locates a first remote computer for instance, the computer 2A. This is accomplished by determining the network address 34 of the computer 2A and the communication port 36 the agent application 27A is simultaneously monitoring in operation 406. The input script file 44 stored on the computer 4 contains the network addresses 34 of all the remote computers 2A-2C to be updated and the communication ports 36 the agent applications 27A-27C are monitoring. It should be appreciated that the agent applications 27A-27B each occupy only one communication port 36, occupy minimal memory, and consume additional CPU 5 resources only upon receiving a command 38.

Once the network address 34 of the computer 2A and the communication port 36 the agent application 27A is monitoring in operation 406 are determined, the routine 400 then continues from operation 402 to operation 404 where the update command 38, also stored in the input script file 44, is transmitted by the manager application 32, via the network 18, to the agent application 27A executing on the remote computer 2A. Next, the routine 400 continues from operations 404 and 406 to operation 408 where the update command 38 is received by the agent application 27A.

The routine 400 then continues to operation 412 where a determination is made as to whether the command is valid. If the command is invalid the routine 400 continues from operation 412 to operation 410 where the command is ignored. The routine 400 then continues to operation 406, described above, and to operation 405 where the update command is aborted at the manager computer 4 and notice of an error is displayed. The routine 400 then continues from operation 405 to operation 434 described below.

If the command is valid, the routine 400 continues from operation 412 to operation 414 where the agent application 27A launches the update application 40, which receives the new BIOS image 28 from the manager computer 4 that provides the application 40 and the new BIOS image 28 at operation 415. In the alternative, the agent application 27A may use a locally stored flashing application for implementation simplicity. Further in the alternative, the update application 40 and the new BIOS image 28 may be received from any data storage device accessible by the network 18. It should be appreciated that the command 38 defines where the update application 40 and the new BIOS image 28 are to be received from thereby instructing each agent application 27 from what storage device to retrieve the update application 40 and the new BIOS image 28. Also, the management application 32 may be instructed to copy the update application 40 and the new BIOS image 28 to the local storage of each remote computer 2A-2C to be updated.

After the update application 40 and the new BIOS image 28 are received into the memory of the computer 27A, the routine 400 continues from operations 414 and 415 to operation 416 where the update application 40A uses the new BIOS image 28A to update the BIOS 13A on the computer 2A. Upon updating BIOS 13A, the routine 400 then continues to operation 418 where a result of the update execution is transmitted to the manager computer 4. The manager computer 4 receives the result transmission at operation 420. It should be appreciated that although the manager application 32 and the agent application 27A are executing an update to the BIOS 13A while an operating system is executing on both computers, the operating system executing on the respective computers may vary in manufacturer and version.

It should also be appreciated that in the interest of security, security measures known in the art may be used to prevent unsecured access to the update operations. For example, updates may be executed behind a secure firewall, authentication credentials may be implemented, and pipe communication ports may be utilized to control security if the OS 16 options are confined to the WINDOWS operating system.

Next the routine 400 continues from operation 418 to operation 428 where a determination is made as to whether the update was successfully completed. If the update was not successfully completed, the routine 400 continues from operation 428 to operation 430 where the update is aborted and control then returns to operation 406 described above. If the update was successfully completed, the routine 400 continues from operation 428 to operation 432 where the computer 2A is rebooted. Reboot of the computer 2A loads the updated BIOS 13A into the RAM 9. The routine 400 then returns to operation 406 described above.

Meanwhile on the manager computer 4, the routine 400 continues from operation 420 to operation 421 where a determination is made as to whether the update was successfully completed. If the update was not successfully completed, the routine 400 continues from operation 421 to operation 422 where notice of an error is displayed and control then passes to operation 434 described below. If the update was successfully completed, the routine 400 continues from operation 421 to operation 434. Alternatively, it should be appreciated that a plurality of status messages on a video display device on the manager computer 4 may be displayed while updating the BIOS 13 with the new BIOS image 28.

At operation 434 a determination is made as to whether there is another remote computer 2 on the network to be updated. If there is not another remote computer 2 for update, the routine 400 continues from operation 434 and terminates at operation 426.

If there is another remote computer 2 for update, the routine 400 continues from operation 434 to operation 427 where the next remote computer is located. Once the address of the next remote computer is determined, the routine 400 returns to operation 404 described above. It should be appreciated that the serial update of each computer 2 is conducive to the transmission control protocol properties of the network 18 in the present embodiment of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for updating a firmware of a network attached computer connected to a computer network, the method comprising:
    monitoring a communication port for a firmware update command to update the firmware of the network attached computer from a manager computer;
    receiving at the network attached computer the firmware update command from the manager computer via the computer network;
    in response to receiving the firmware update command, receiving an update application and a new firmware file; and
    executing the update application to update the firmware utilizing the new firmware file;
    wherein the firmware update command is transmitted by a management application running on the manager computer utilizing a network address for each network attached computer to be updated and an identity of the communication port upon which an agent application executing on the network attached computer:
    monitors command activity,
    receives the firmware update command, and
    receives the update application and the new firmware file.

2. The method of claim 1, further comprising:
    determining whether the update application has completed the firmware update; and
    in response to the firmware update being complete, rebooting the network attached computer upon which the update was performed.

3. The method of claim 1, wherein the firmware update command identifies one or more storage devices connected to the network from which the update application and the new firmware file are to be received and wherein the agent application receives the update application and the new firmware file from the identified one or more storage devices.

4. The method of claim 1, wherein the agent application monitors command activity upon only one communication port and utilizes additional processor resources on the network attached computer only upon receiving the firmware update command.

5. The method of claim 1, wherein the firmware update command is transmitted to a plurality of network attached computers sequentially.

6. The method of claim 5, wherein the plurality of network attached computers utilizes a plurality of different operating systems.

7. The method of claim 1, wherein the computer network comprises a Transmission Control Protocol/Internet Protocol (TCP/IP) network.

8. The method of claim 1, wherein the network attached computer comprises a server computer and wherein the update application and the new firmware file reside on a storage device connected to the computer network and separate from the manager computer.

9. The method of claim 1, wherein executing the update application comprises executing the update to the firmware while an operating system is executing on the network attached computer.

10. The method of claim 1, further comprising in response to executing the update application to update the firmware, transmitting a result of the update wherein an update status message is displayed on a video display device of the manager computer.

11. The method of claim 1, wherein the firmware comprises a basic input/output system of the network attached computer.

12. The method of claim 1, wherein the network attached computer is without a video display device and a keyboard.

13. The method of claim 1, wherein the update to the firmware is initiated and executed within a secure firewall.

14. The method of claim 1, wherein the communication port comprises a pipe communication port controlled by an operating system security system.

15. A computer-controlled apparatus configured to perform the method of claim 1.

16. A computer-readable storage medium comprising computer executable instructions which, when executed by a computer, cause the computer to perform the method of claim 1.

17. A system for remotely updating a firmware of a remote computer connected to a distributed computer network, the system comprising:
    a manager computer operative to:
        transmit a firmware update command to update the firmware of one or more computers via the distributed computer network, and;
    the remote computer operative to:
        receive the firmware update command;
        in response to receiving the firmware update command, receive an update application and a new firmware file;
        execute the update application and the new firmware file to update the firmware on each computer;
        determine whether the update application has completed the firmware update; and in response to the firmware update being complete, restart the first computer upon which the update was performed;
    wherein the firmware update command is transmitted to each of a plurality of remote computers in serial by a management application executing on the manager computer and operative to utilize:
        a network address for each remote computer to be updated;

an identity of a specified communication port upon which an agent application executing on each computer monitors command activity; and the firmware update command, wherein the firmware update command defines where the update application and the new firmware file are stored.

18. The system of claim 17, wherein the update application and the new firmware file may reside on any computer or storage device connected to the network, wherein the management application and the agent application are operating system dependent, wherein one or more operating systems may differ among any computer connected to the network, and wherein the firmware comprises a basic input/output system.

19. The system of claim 18, wherein the system further comprises:

a video display; and wherein the remote computer is further operative to:

in response to executing the update application to update to the firmware, transmit a result of the firmware update and wherein the video display displays a plurality of update status messages while updating the firmware of the plurality of remote computers.

20. A method for updating firmware of a remote computer via a Transmission Control Protocol/Internet Protocol (TCP/IP) TCP/IP computer network comprising:

receiving a firmware update command at the remote computer, wherein the command is received via the TCP/IP computer network from a management application executing on a manager computer;

receiving the firmware update command at an agent application executing on the remote computer wherein the agent application:

executes during operation of an operating system on the remote computer, and monitors command activity on a specified communications port;

in response to receiving the firmware update command, receiving from a storage device connected to the network and designated by the firmware update command an update application and a new firmware file to update the firmware of the remote computer;

executing the update application to update the firmware utilizing the new firmware file;

in response to executing the update application, transmitting a result of the update to the manager computer; and in response to the update being complete, restarting the remote computer upon which the update was performed.

21. The method of claim 20, wherein the firmware comprises a basic/input output system.

22. The method of claim 20, wherein the agent application is operating system dependent.

* * * * *